United States Patent
Onizuka et al.

(10) Patent No.: US 6,285,572 B1
(45) Date of Patent: Sep. 4, 2001

(54) METHOD OF OPERATING A POWER SUPPLY SYSTEM HAVING PARALLEL-CONNECTED INVERTERS, AND POWER CONVERTING SYSTEM

(75) Inventors: Keigo Onizuka, Gunma-ken; Masaki Madenokouji, Saitama-ken; Isao Morita, Gunma-ken; Yasuhiro Makino, Saitama-ken, all of (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/514,767

(22) Filed: Feb. 28, 2000

(30) Foreign Application Priority Data

Apr. 20, 1999 (JP) .................................. 11-112453
Apr. 20, 1999 (JP) .................................. 11-112454

(51) Int. Cl.$^7$ ............................. H02M 7/00; H02M 3/24
(52) U.S. Cl. ............................................. 363/72; 363/79
(58) Field of Search .................. 363/72, 70, 76, 363/79, 50, 56, 54, 37, 41; 315/307

(56) References Cited

U.S. PATENT DOCUMENTS 3,823,362 * 7/1974 Bailey ................................... 363/72
4,039,925 * 8/1977 Fletcher et al. ........................ 363/70
5,120,929 6/1992 Kobayashi et al. .

FOREIGN PATENT DOCUMENTS

| 293 469 A5 | 8/1991 | (DE) . |
| 0 489 971 A1 | 6/1992 | (EP) . |
| 06165513 A | 6/1994 | (JP) . |
| 6-165513 | 6/1994 | (JP) . |
| 09091049 A | 4/1997 | (JP) . |

* cited by examiner

Primary Examiner—Rajnikant B. Patel
(74) Attorney, Agent, or Firm—Knobbe, Martens, Olson & Bear LLP

(57) ABSTRACT

A method whereby a plurality of inverters for converting DC power outputted from a DC power supply, such as solar cells or fuel cells, to AC power are operated efficiently without being biased to particular inverters. The number of inverters to be run is determined in correspondence with at least one output value of the DC output or AC output, and the determined number of inverters are selected and made to run from among the plurality of inverters on the basis of a predetermined rule. In addition, a parallel-connected system is disclosed for enabling efficient and appropriate parallel-in operation by the use of inverters, with one of the inverters controlling the remaining inverters and effecting system interconnection protection.

20 Claims, 6 Drawing Sheets

METHOD OF OPERATING A POWER SUPPLY SYSTEM HAVING PARALLEL-CONNECTED INVERTERS, AND POWER CONVERTING SYSTEM

BACKGROUND OF THE INVENTION

1. Field of the Invention

The present invention relates to a power supply system in which a DC output of a DC power supply whose electric energy increases and decreases, such as solar cells, wind power generators, and fuel cells, is converted to an AC output by a plurality of inverters and is supplied to a system, and concerns a technique for controlling the inverters with high efficiency. In addition, the present invention relates to a parallel-connected system in which electric power generated by a power generating means such as solar cells is converted by inverters to electric power corresponding to a commercial power supply, and is outputted to the commercial power supply.

2. Description of the Related Art

As such a power supply system, a photovoltaic power generation system using solar cells is generally known. FIG. 6 is a system diagram of a conventional photovoltaic power generation system. This photovoltaic power generation system is configured such that a plurality of solar cells (DC power supply) 101 are arranged on the roof of a house, DC outputs generated by these solar cells 101 are collected into one output by a junction box 102, and this DC output is then converted to an AC output through an inverter 103. Subsequently, the power is supplied to the branch circuit inside the house and a commercial-use power system 106 through a distribution board 104. Incidentally, reference numeral 105 denotes an in-house load connected to the branch circuit.

Generally, the inverter has the characteristic that its efficiency declines extremely during a low output. There has been a problem in that if DC/AC conversion is effected by a single inverter in correspondence with the estimated maximum energy generated by the photovoltaic power generation system, the DC/AC conversion efficiency declines during a low output. To solve such a problem, Japanese Patent Application Laid-Open (JP-A) No. 6-165513, for example, discloses a system in which a plurality of inverters with small outputs are connected in parallel, and the number of inverters which are run is increased or decreased in correspondence with the energy generated by the solar cells so as to suppress the decline in the conversion efficiency during a low output.

In addition, in a parallel-connected system, the DC power generated by a generating apparatus such as a photovoltaic power generator is converted to AC power corresponding to a commercial power supply by the inverters, and is then supplied to the commercial power supply.

With the inverters used in such a parallel-connected system, independent operation due to service interruption of the commercial power supply is prevented, and the system interconnection is protected against an overvoltage, an undervoltage, a frequency rise, and a frequency drop in the commercial power supply.

With the inverters used in the parallel-connected system, the most efficient operation is possible during the output of rated power. However, with the power generator using solar cells, since the generated power increases and decreases due to the quantity of solar radiation and the like, the inverters are subjected to maximum power point tracking control (MPPT control) so that the output efficiency becomes highest in correspondence with the increase or decrease in the generated power when the input power is less than the rated power.

As described above, with the inverters whose output power is large, if the input power is excessively low with respect to the rated power, the output efficiency drops extremely. For this reason, a proposal has been made that, with the parallel-connected system, a plurality of inverters be connected in parallel, and the number of driven inverters be set in correspondence with the input power, so that even when the generated power is low, the inverters can be driven efficiently.

With the conventional method, the number of inverters which are driven is determined merely in correspondence with the output power, and no consideration is given to the selection of the inverters which are driven. For this reason, only particular inverters are driven during a low output, and the other inverters are driven only when the output has increased, with the result that the running time of the particular inverters becomes longer than that of the other inverters. Hence, there has been a problem in that the service life of the particular inverters with a long running time expires earlier than the other inverters.

Furthermore, there has been a problem in that if particular inverters among the plurality of inverters are not effective, the overall system fails to work.

In addition, there is a problem in that if the respective output powers of the plurality of inverters are individually controlled, conversely, the conversion efficiency drops depending on the generated power, the number of driven inverters, and so on. Further, if the individual inverters are separately provided with system integration protection when the plurality of inverters are run in parallel, there are cases where their mutual outputs and protective operations interfere with each other, rendering appropriate protection impossible.

SUMMARY OF THE INVENTION

Accordingly, it is an object of the invention to provide a method of operating a power supply system having a plurality of inverters, such that the inverters are driven with high efficiency, thereby overcoming the above-described drawbacks of the conventional art.

To this end, in accordance with a first aspect of the invention, there is provided a method of operation for a power supply system having a plurality of inverters connected in parallel with a DC power supply whose generated electric energy increases or decreases, in which the inverters convert an electric output from the DC power supply to frequency- and voltage-controlled AC power and output the AC power to a system, the method comprising the steps of: (a) setting one of the inverters to serve as a master unit and the other inverters to serve as slave units, wherein the master unit controls the slave units; and (b) allowing the master unit to control the slave units on the basis of at least one of an increase or decrease in the electric energy from the DC power supply and an increase or decrease in the AC power outputted from the inverters.

In accordance with the above-described first aspect of the invention, of the plurality of inverters, one inverter which is set as the master unit controls the operation of the remaining inverters, whose order has been set in accordance with a predetermined rule, on the basis of the increase or decrease of electric energy of the DC power supply or an increase or decrease of the amount of AC power output from the inverter.

Further, in this aspect of the invention, when running of a generator is suspended, the master unit sets a master unit which is to be used during the start of the next running of the generator. Such a setting can be effected on the basis of integrated values of the running times of the inverters or their amounts of output power.

As a result, the integrated values of the running times or output powers can be substantially equalized among the plurality of inverters, and it is possible to prevent the running times of particular inverters from becoming long.

Further, the inverters are respectively connected to remote controllers for remote controlling, and the remote controllers are connected to each other in such a manner as to be capable of transmitting and receiving signals to and from one another. The operation of the inverters is effected through the remote controllers.

Further, the ordering of slave units to be run next may be randomly set by using random numbers.

Further, the ordering of slave units to be run next may be set in the ascending order of the running times thereof.

Further, the ordering of slave units to be run next may be set in the ascending order of the amounts of output power thereof.

Another object of the invention is to provide an efficient parallel-connected system in which a plurality of inverters are connected in parallel, and electric power generated by a generator is converted to electric power corresponding to a commercial power supply and is outputted by the inverters, thereby overcoming the above-described drawbacks of the conventional art.

To this end, in accordance with another aspect of the invention, there is provided a system for converting DC power to AC power, comprising: (a) a plurality of inverters, each inverter being adapted to receive DC power and convert the DC power to AC power; and (b) a controller connected to the inverters and controlling operation of the inverters on the basis of DC power available, the controller causing more inverters to run if sufficient DC power is available and fewer inverters to run if there is insufficient DC power, wherein the controller operates any one of the inverters such that the amount of AC power outputted from the any one of the inverters increases or decreases in correspondence with an increase or decrease in the amount of electric power outputted from the DC power supply, and the controller operates remaining ones of the inverters at a predetermined standard value.

In accordance with this aspect of the invention, when two or more inverters are running, any one of the inverters is made to effect, for example, MPPT control, and the other inverters are made to effect rated operation.

Consequently, as compared with the case where individual inverters effect MPPT control, efficient operation becomes possible. Further, it is possible to prevent an increase or decrease in the output power of any of the inverters, which increase or decrease would be caused by MPPT control effected by the individual inverters, from affecting the operation of the other inverters.

Furthermore, in accordance with still another aspect of the invention, there is provided a system for converting generated electric power to AC power, wherein a plurality of inverters provided respectively with protecting means for effecting system interconnection protection for a commercial power supply are connected in parallel, and electric power generated by a generator is converted to electric power corresponding to a commercial power supply and is outputted from a number of inverters which number is determined on the basis of the amount of generated electric power, comprising: a controller for effecting protected operation of the plurality of inverters by a protecting means provided in at least one of the inverters when at least two of the inverters are running.

In accordance with this aspect of the invention, when a plurality of inverters are running, the system interconnection protection of the other inverters is effected with respect to independent operation as well as overvoltage, undervoltage, frequency rise, and frequency drop of the commercial power supply, by using the protecting means of any one of the inverters. Namely, the system interconnection protection of the plurality of inverters is collectively effected by the protecting means of any one of the inverters.

As a result, it is possible to prevent a situation in which there occur problems such as the protective operation timing deviates due to system interconnection protection effected by a plurality of inverters, or it becomes impossible for any inverter to appropriately effect the system interconnection protection due to the deviation of this protective operation timing.

The controlling means used in this aspect of the invention may adopt an arrangement in which one master unit is set, and this master unit serves to effect MPPT control or system interconnection protection.

In addition, the controlling means may include remote controllers which are respectively connected to the plurality of inverters and communication means for connecting the remote controllers with one another.

Consequently, it is possible to accurately control the operation of the plurality of inverters without providing an exclusive-use controlling means.

DESCRIPTION OF THE PREFERRED EMBODIMENT

Figure 1:
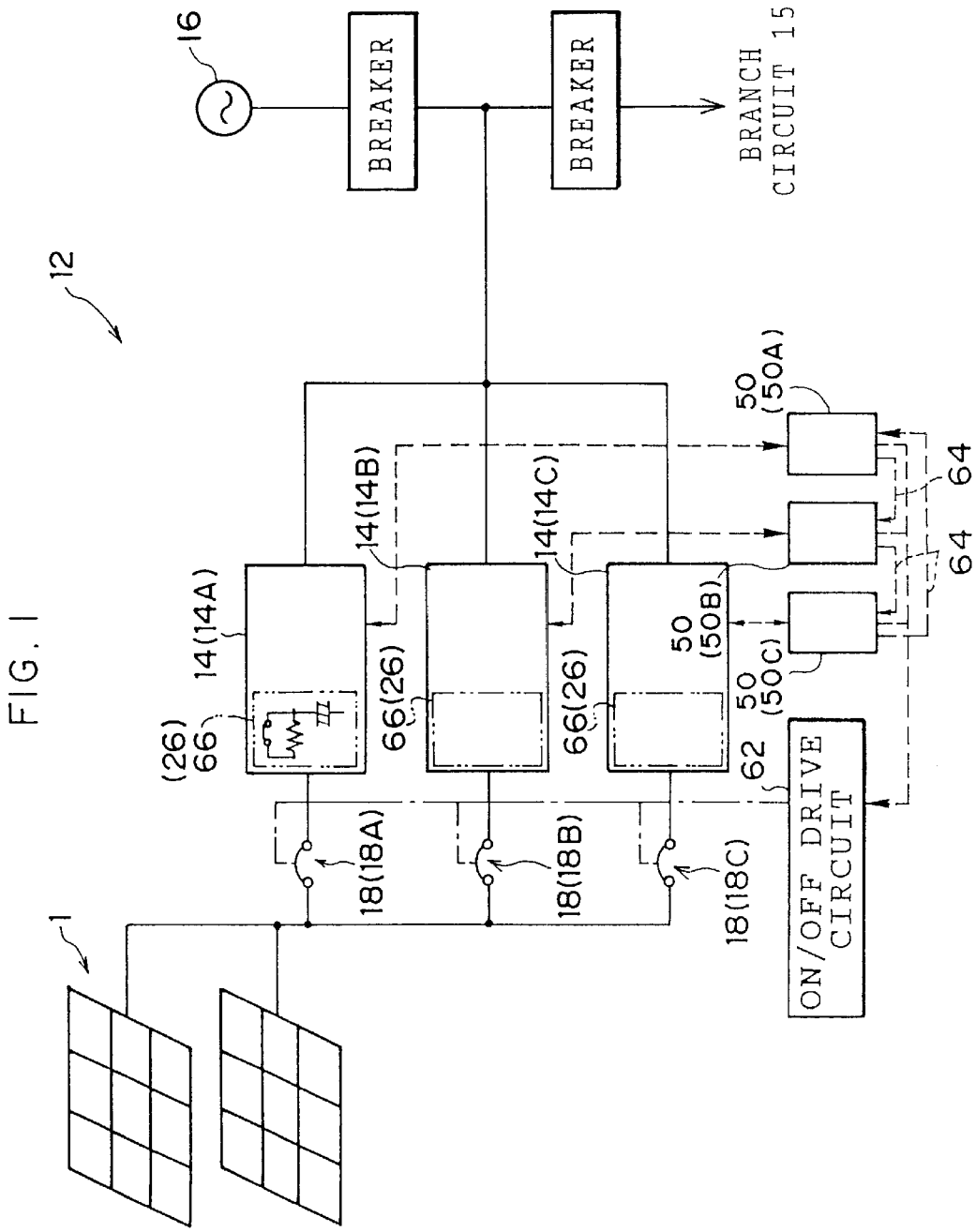
FIG. 1 is a block diagram of a power supply system which is used as a parallel-connected system in accordance with an embodiment of the invention.

Hereafter, a description will be given of an embodiment of the invention. FIG. 1 shows a schematic structure of a power supply system 12. In this power supply system 12, a plurality of inverters 14 (by way of example, three inverters 14A to 14C) are connected in parallel to a DC power supply 1 (e.g., solar cells consisting of a plurality of modules).

The input side of each inverter 14 is connected to the. DC power supply 1 through a magnet switch 18 (18A, 18B, 18C) of a latch type in which the opening and closing of the contact is alternately changed over.

The output side is connected to a commercial power supply 16. In this way, the power supply system 12 forms a parallel-connected power generating system in which DC power outputted from the DC power supply 1 is converted into AC power of a frequency which is the same as that of the commercial power supply 16 by the inverters 14, and the AC power is outputted to a branch circuit 15 connected to the commercial power supply 16. In the present embodiment, an example is described in which the three inverters 14A, 14B, 14C (these inverters will be referred to as the inverters 14 unless otherwise specified) each having an output of 4.0 kW are used for the DC power supply 1 whose maximum output power is 12 kw.

Figure 2:
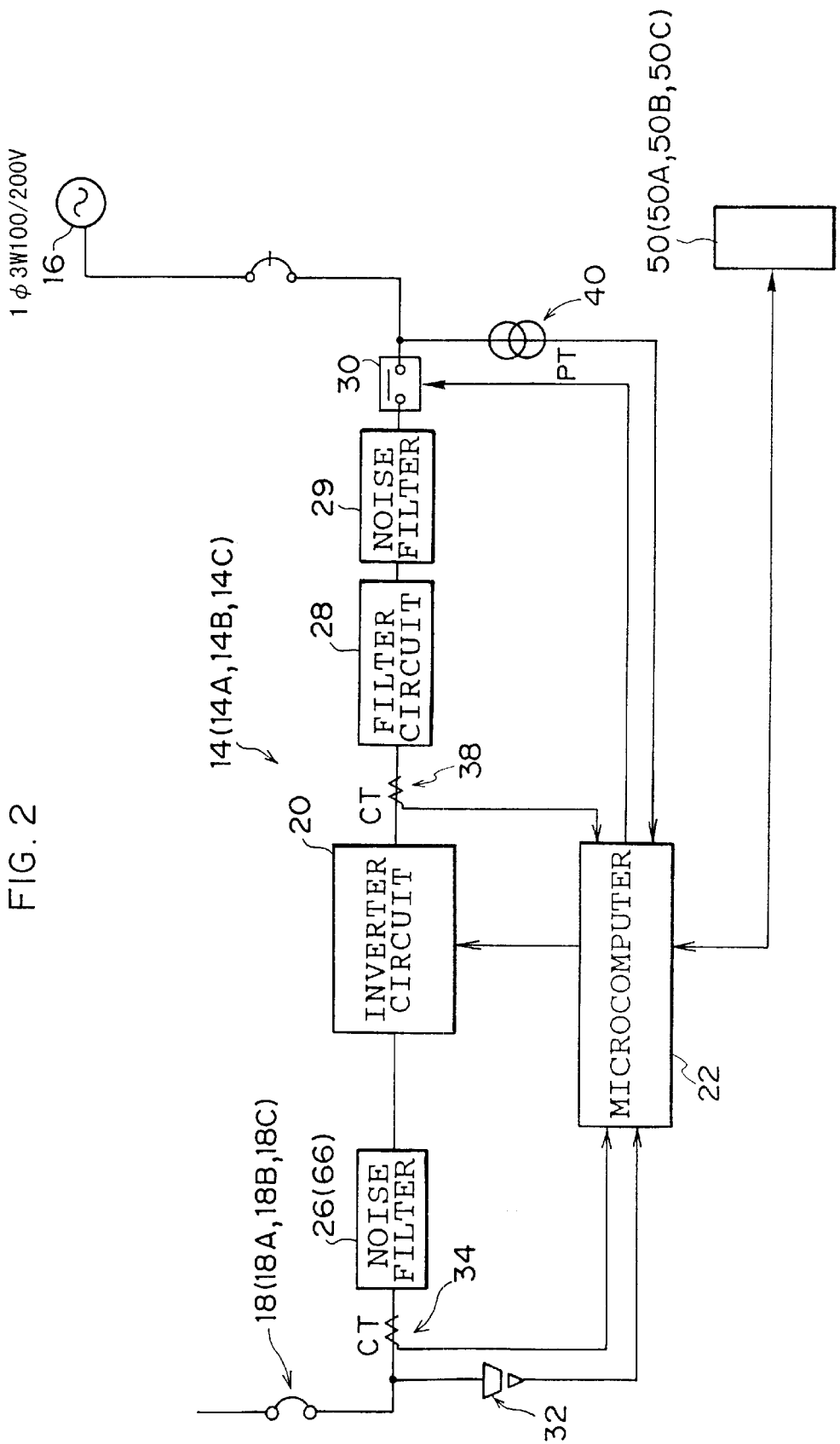
FIG. 2 is a block diagram illustrating a schematic structure of an inverter used in the power supply system.

As shown in FIG. 2, the inverter 14 has an inverter circuit 20 and a microcomputer 22 for controlling the inverter circuit 20. The DC power inputted to the inverter 14 through the magnet switch 18 is supplied to the inverter circuit 20 through a noise filter 26.

The DC power inputted to the inverter circuit 20 is converted to AC power of a frequency substantially identical to that of the commercial power supply 16 by the inverter circuit 20, and the AC power is outputted. At this time, the inverter circuit 20 switches the DC power on the basis of the pulse width modulation (PWM) theory, and outputs a pseudo sine wave of a frequency substantially identical to that of the commercial power supply 16. The AC power outputted from the inverter circuit 20 is controlled such that the voltage thereof becomes 5 to 10 volts higher than the voltage supplied from the commercial power supply 16, and is supplied to the branch circuit 15 by a transformerless system through a filter circuit 28, a noise filter 29, and a contactor Connected to the microcomputer 22 are an input-voltage detecting unit 32 formed by an isolation amplifier for detecting the DC voltage inputted to the inverter circuit 20, an input-current detecting unit 34 formed by a current transformer (CT) for detecting the DC current, an output-current detecting unit 38 formed by a current transformer (CT) for detecting the AC current outputted from the inverter circuit 20, and a voltage-waveform detecting unit 40 for detecting the system voltage and voltage waveform in the commercial power supply 16 by a potential transformer (PT).

On the basis of the DC power detected by the input-voltage detecting unit 32 and the input-current detecting unit 34 and the voltage detected by the voltage-waveform detecting unit 40, the microcomputer 22 controls the on-duty ratio of a switching signal for driving an unillustrated switching element of the inverter circuit 20.

As a result, the inverter 14 outputs AC power whose phase matches the phase of the commercial power supply 16, whose frequency matches the frequency of the commercial power supply 16, and whose voltage is from 5 to 10 volts higher than the voltage of the commercial power supply 16. The phase of the AC power outputted from the inverter is made to match the phase of the commercial power supply 16 by determining the zero-cross from the detected waveform of a voltage waveform detecting section 40 and making the zero-cross of a pseudo-sine-waveform wave match the zero-cross of the detected waveform. It should be noted that the AC power outputted from the inverter circuit 20 has a sawtooth waveform, and as the filter circuit 28 eliminates harmonic components from the output voltage from the inverter circuit 20, AC power of a sine wave is outputted from the inverter 14.

Meanwhile, the contactor 30 is controlled by the microcomputer 22, and the microcomputer 22 effects the connection and disconnection between the inverter 14 and the commercial power supply 16 by means of this contactor 30.

Consequently, for example, when the output power from the DC power supply 1 is small and the running of the inverter 14 is stopped because the energy generated by the solar cell modules is small or no power is being generated, the microcomputer 22 disconnects the inverter 14 from the commercial power supply 16, and connects the inverter 14 and the commercial power supply 16 immediately before the inverter 14 starts running again.

In addition, when it is determined from the voltage waveform detected by the voltage-waveform detecting unit 40 that the commercial power supply 16 is in a state of service interruption, the microcomputer 22 quickly disconnects the inverter 14 from the commercial power supply 16 by means of the contactor 30 so as to prevent the independent operation and the like of the inverter 14. Further, the microcomputer 22 effects protection of the inverter 14 from an overvoltage (OVR), an undervoltage (UVR), a frequency rise (OFR), a frequency drop (UFR), and independent operation. It should be noted that, as for the inverters 14, conventionally known structures and controlling methods can be applied, and a detailed description thereof will be omitted in this embodiment.

As shown in FIG. 1, in the power supply system 12, remote controllers 50 (50A, 50B, and 50C) are respectively connected to the inverters 14.

Figure 3:
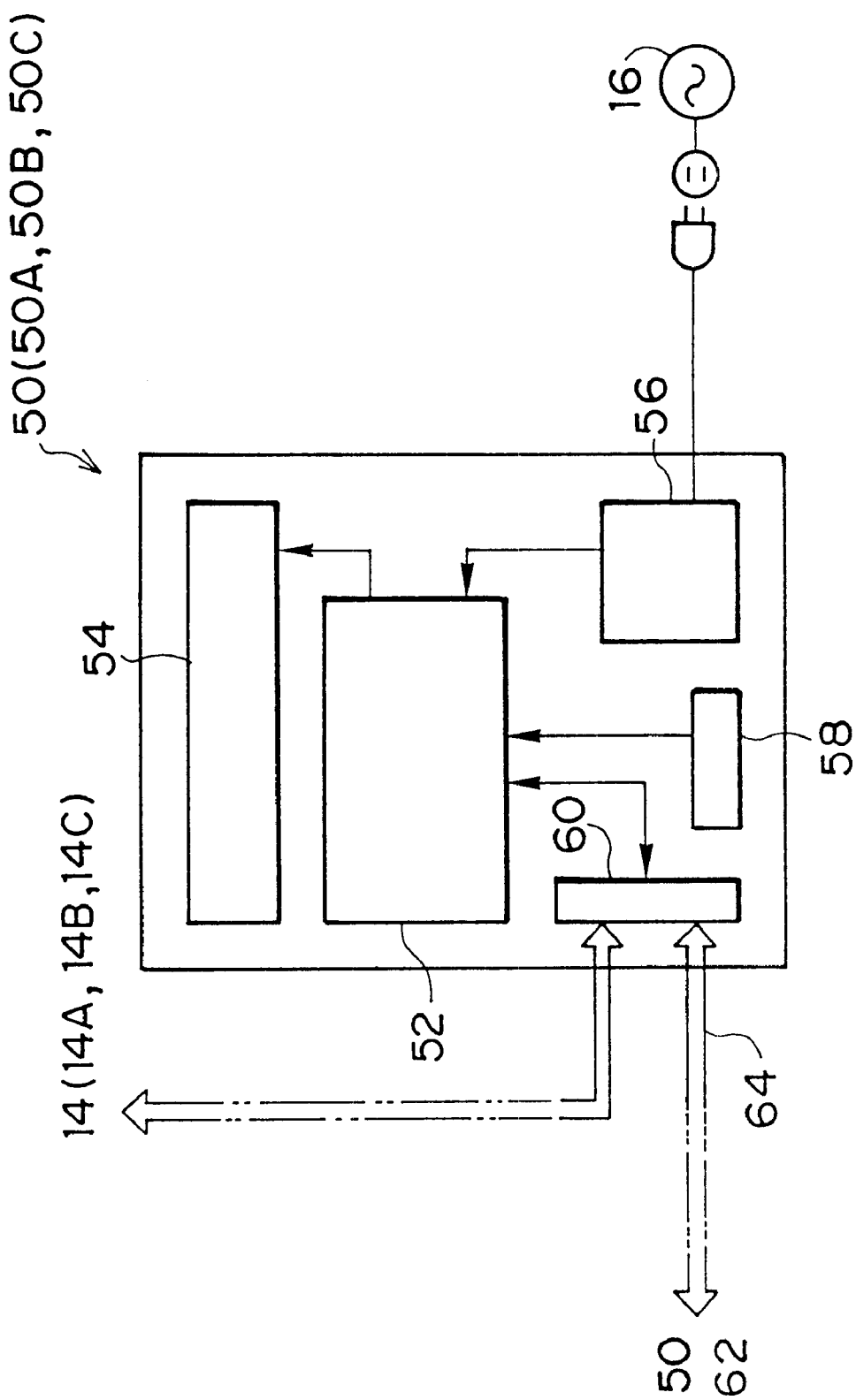
FIG. 3 is a block diagram illustrating a remote controller used in the power supply system.

As shown in FIG. 3, each remote controller 50 is provided with a control unit 52 having a microcomputer, a display unit 54 using an LCD or the like, and a power supply circuit 56. The display unit 54 and the power supply circuit 56 are connected to the control unit 52. Further, the remote controller 50 is provided with a setting switch unit 58 and a communication connector 60, and these units are connected to the control unit 52.

The power supply circuit 56 is provided with an unillustrated battery for backup and is connected to the commercial power supply 16, so that the remote controller 50 is operated by power supplied from the commercial power supply 16. Namely, the DC power is not inputted to the remote controller 50 from the DC power supply 1, so that the remote controller 50 is operable even if the inverter 14 is in a stopped state.

The microcomputer 22 of the inverter 14 is connected to the communication connector 60 of the remote controller 50. Consequently, the remote controller 50 is capable of management of operation such as the integration of the amount of output power from the inverter 14. In addition, if the inverter 14 stops running due to the stopping of the independent operation, this information is inputted from the microcomputer 22 to the remote controller 50.

Further, as shown in FIG. 1, the remote controllers 50 are connected to a drive circuit 62 for driving the magnet switches 18 on and off.

If the magnet switch 18 is turned off, the DC power is not inputted to the inverter 14, so that the inverter 14 stops, whereas if the magnet switch 18 is turned on to supply the DC power to the inverter 14, running of the inverter 14 becomes possible.

Each remote controller 50 turns off the magnet switch 18 when outputting a control signal for instructing the stopping of running to the microcomputer 22 of the inverter 14, and turns on the magnet switch 18 when outputting a signal for instructing the start of running thereto. It should be noted that the microcomputer 22 may turn on and off the magnet switch 18 on the basis of an operation instruction (i.e., a start running instruction or a stop running instruction) inputted to the microcomputer 22 from the remote controller 50.

The communication connector 60 of each remote controller 50 is connected to the other remote controllers by communication lines 64. At this time, the remote controllers 50 are connected by the exclusive-use communication lines 64 so as to form a loop, for example.

As a result, the exchange of information on the running states of the inverters 14A, 14B, and 14C connected to each other becomes possible among the remote controllers 50A, 50B, and 50C.

In the power supply system 12 configured as described above, the arrangement provided is such that any one of the inverters 14 serves as a master unit, and controls, together with the remote controller 50 connected to the master unit, the operation of the other inverters 14 serving as slave units. It should be noted that the setting of the master unit and the slave units is possible by unillustrated dip switches provided in the setting switch units 58 of the remote controllers 50 connected to the respective inverters 14, but in the present embodiment, a description will be given of an example in which the master unit is not specified. Incidentally, the dip switches are used as switches for setting addresses for specifying the remote controllers 50.

The remote controller 50 connected to the inverter 14 which is to serve as the master unit is set in a state in which the magnet switches 18A, 18B, and 18C are closed to allow any of the inverters 14 to be able to run by the power supplied from the DC power supply 1. Then, the inverter 14 which initially started running when the solar cell modules, i.e., the DC power supply 1, started generating electricity becomes the master unit, and the master unit and the slave units are determined as the remote controller 50 connected to that inverter 14 makes the announcement of being the master unit to the other remote controllers through signal lines.

Subsequently, the remote controller 50 connected to the inverter 14 which has been set as the master unit sets the inverter which has been set as the master unit in a constantly running state, and operates the inverters 14 which have been set as the slave units in correspondence with the increase or decrease in the output power of the DC power supply 1.

In addition, to set the remote controller 50 connected to the inverter 14 which initially serves as the master unit without using the dip switch of the setting switch unit 58, the setting is made in the state in which the magnet switches 18A, 18B, and 18C are closed to allow any of the inverters 14 to be able to run by the power supplied from the DC power supply 1. Subsequently, the inverter 14 which initially started running when the solar cell modules, i.e., the DC power supply 1, started generating electricity is set as the master unit.

The remote controller 50 connected to the inverter 14, which has thus been set as the master unit, first sets the remaining inverters 14 as the slave units so that the other inverters 14 do not start. Subsequently, the remote controller 50 connected to the inverter 14 which has been set as the master unit sets the inverter 14 which has been set as the master unit in the constantly running state, and operates the inverters 14 which have been set as the slave units in correspondence with the increase or decrease of the output power in the DC power supply 1.

Meanwhile, in the power supply system 12, the inverter 14 to be set as the next master unit is set at the daily suspension of running, for example, on the basis of information regarding operation, such as integrated values of output power (amounts of output power) of the inverters 14A to 14C and the integrated values of running times, so that the integrated values of the amounts of output power and the running times will become equalized among the inverters 14A to 14C.

Namely, the inverter 14 whose amount of output power or whose running time is the minimum is used as the inverter 14 which is to be set as the next master unit.

For this reason, when the inverters 14 set as the slave units are stopped, the remote controllers 50 connected to the inverters 14 set as the slave units output the integrated values of output power (amounts of output power) of these inverters 14 to the remote controller 50 connected to the inverter 14 set as the master unit.

When the DC power from the DC power supply 1 is stopped, the remote controller 50 connected to the inverter 14 set as the master unit stops the inverter 14 connected thereto, and calculates the amount of output power of this inverter 14. Subsequently, a comparison is made among the amounts of output power of the respective inverters 14, and the inverter 14 whose amount of output power is the minimum is set as the next master unit, whereupon processing ends.

It should be noted that, as the method of setting the next master unit, an arrangement may be provided such that the master unit is set randomly by using random numbers.

As a result, when the power supply system 12 is started the next time, the remote controller 50 connected to the inverter 14 which has been newly set as the master unit controls the operation of the inverters 14.

The inverter 14 which has been set as the master unit effects maximum power point tracking (MPPT) control for fetching a maximum output by following the increase and decrease in the inputted DC power. In addition, the inverters 14 which have been set as the slave units are subjected to constant-level energy control for constantly obtaining maximum outputs. The remote controller 50 of the inverter 14 which has been set as the master unit operates the slave inverters 14 and opens and closes the magnet switches 18 in correspondence with the increase and decrease in the output of the DC power supply 1, such that the slave inverters 14 can be subjected to constant-level energy control.

At this time, as shown in FIG. 1, each inverter 14 is provided with a charging-current suppressing circuit 66 (not shown in FIG. 2) so as to prevent transient variation of voltage of the DC power supply 1 due to the charging of a large-capacity condenser provided on the DC side of the inverter 14 when the magnet switch 18 is turned on.

In addition, with the power supply system 12, the remote controller 50 connected to the inverter 14 which has been set as the master unit collectively effects the prevention of independent operation as well as interconnected protection with respect to overvoltage (OVR), undervoltage (UVR), frequency drop (UFR), and frequency rise (OFR), so as to prevent interference and malfunction occurring due to the interconnected protection effected separately by the respective inverters 14.

In this power supply system 12, first, the setting of the master unit of the inverters 14 is effected. In the setting of the master unit, addresses are set by the dip switches of the setting switch units 58 provided in the remote controllers 50 connected to the respective inverters 14. It should be noted that one master unit may be set as an initial value.

In addition, when the master unit and slave units are automatically set, the magnet switches 18A to 18C are turned on in the state in which the output of the DC power supply 1 is being stopped, so that the inverters 14 are able to run. In this state, if the DC power supply 1 starts outputting the DC power at sunrise, for example, the inverters 14A to 14C start running with slight time lags. At this time, when any of the inverters 14 starts running, a signal representing the start of running is outputted to the remote controller 50.

The remote controller 50 connected to the inverter 14 which initially started running outputs control signals to the other remote controllers 50 so that the other inverters 14 will not start. Consequently, the inverter 14 which first started running becomes the master unit, and the other inverters 14 are set as the slave units.

When the setting of the master unit and slave units is thus completed among the remote controllers 50A to 50C connected to the inverters 14A to 14C, the operation of the inverters 14A to 14C is controlled in correspondence with the DC power outputted from the DC power supply 1.

Figure 4:
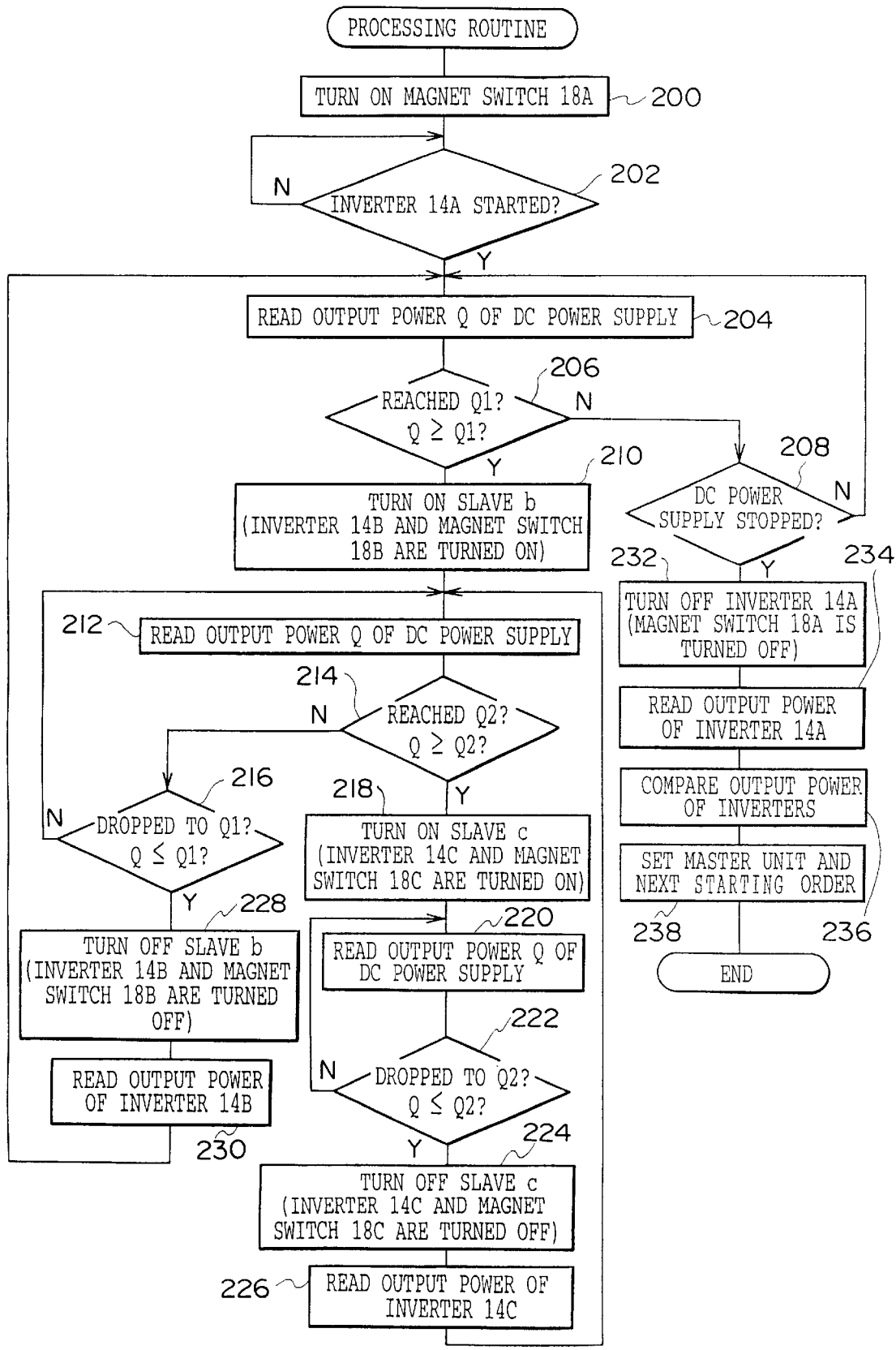
FIG. 4 is a flowchart illustrating a control routine for the power supply system in accordance with the embodiment.

The flowchart shown in FIG. 4 illustrates an outline of control of the inverters 14A to 14C by the remote controller 50 connected to the inverter 14 which has been set as the master unit.

Referring now to FIG. 4, a description will be given under the assumption that the inverter 14A connected to the remote controller 50A is set as the master unit and that the amounts of output power, a0 kWh, b0 kWh, and c0 kWh, of the inverters 14A, 14B, and 14C are such that a0<b0<c0. As a result, the remote controller 50A connected to the inverter 14A effects control in such a manner as to consecutively start up the inverters 14B and 14C as the DC power (output power Q) outputted by the DC power supply 1 increases, and in such a manner as to consecutively shut down the inverters 14C and 14B as the output power Q decreases. Hereafter, a description will be given by referring to the inverter 14A as the "master unit" and the inverters 14B and 14C as the "slave unit b" and the "slave unit c," respectively, and the steps of the flowchart will be indicated by numbers.

The remote controller 50A connected to the master unit turns on the magnet switch 18A so as to set the master unit in a runnable state (Step 200). Consequently, when the DC power supply 1 starts outputting the DC power at sunrise, the master unit runs to output the AC power.

Upon confirming that the master unit has started running (YES in the determination in Step 202), the remote controller 50A connected to the master unit reads the input power to the master unit, i.e., the output power Q (Step 204). The remote controller 50A connected to the master unit then confirms whether or not the output power Q has reached the power Q1 at which the ensuing slave unit b can also be run (Step 206), or whether or not the DC power supply 1 has stopped and the DC power has ceased to be outputted (Step 208).

If the output power Q from the DC power supply 1 has increased and reached the power Q1 at which the slave unit b can also be run (YES in the determination in Step 206), the remote controller 50B connected to the slave unit b is turned on (Step 210). Upon being turned on, the remote controller 50B connected to the slave unit b turns on the magnet switch 18B so that the slave unit b starts running.

Figure 5:
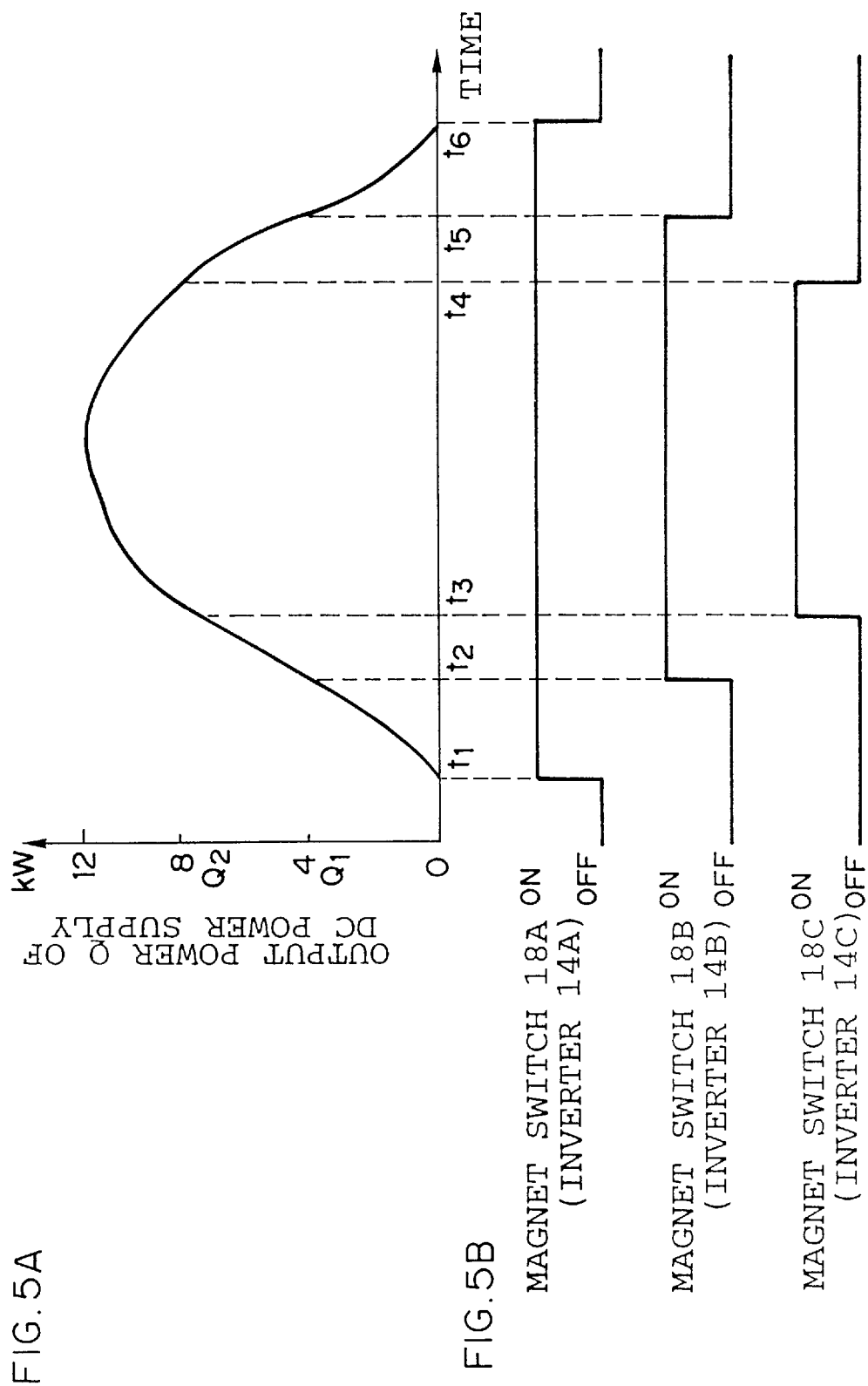
FIG. 5A is a diagram illustrating an example of the change in the amount of output power of a DC power supply.
FIG. 5B is a timing chart illustrating the operation of inverters in accordance with FIG. 5A.
Figure 6:
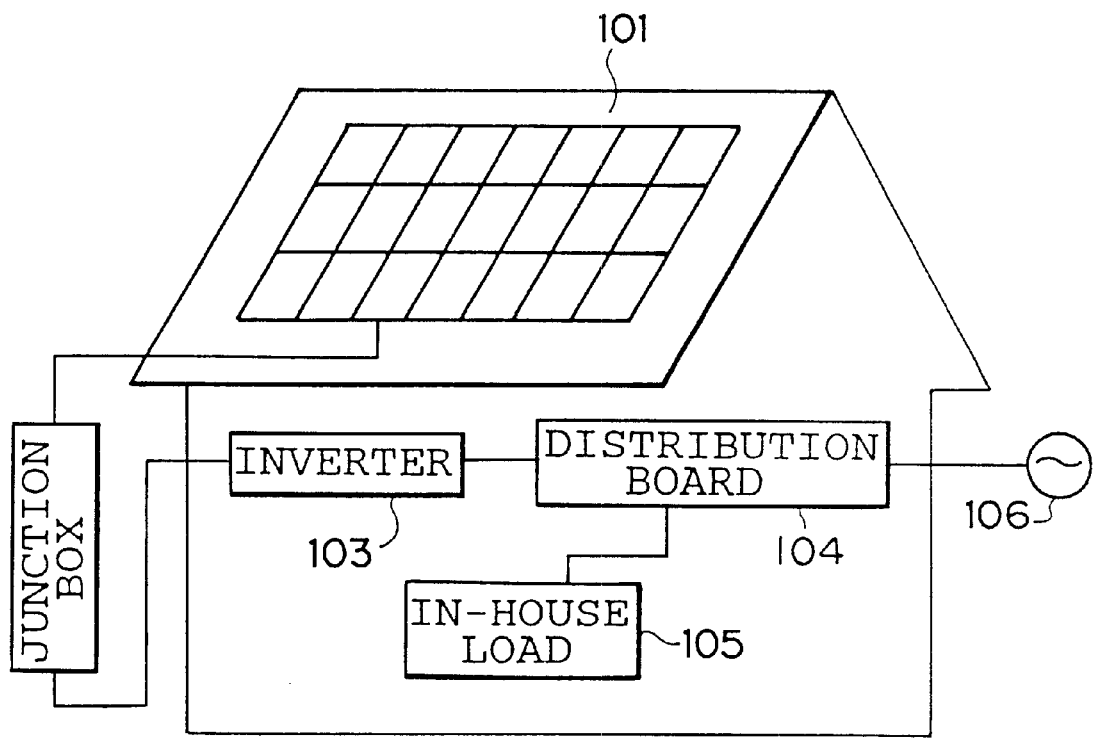
FIG. 6 is a diagram of a system structure of a conventional photovoltaic power generation system.

Consequently, as shown in FIG. 5B, in the power supply system 12, the master unit and the slave unit b are controlled to convert the output power Q from the DC power supply 1 to AC power. In the flowchart shown in FIG. 4, the output power Q from the DC power supply 1 is then read (Step 212), and confirmation is made as to whether or not this output power Q has reached the power Q2 at which the next slave unit c can also be run (Step 214), or whether or not the output power Q has dropped to the power Q1 at which the slave unit b is shut down (Step 216).

Here, if the output power Q from the DC power supply 1 has reached the power Q2 at which the slave unit c can be run(YES in the determination in Step 214), the remote controller 50C connected to the slave unit c is turned on (Step 218). Upon being turned on, the remote controller 50C connected to the slave unit c turns on the magnet switch 18C so that the slave unit c starts running.

Consequently, as shown in FIG. 5B, in the power supply system 12, the output power Q from the DC power supply 1 is converted to AC power and is outputted by the master unit and the slave units b and c.

Subsequently, in the flowchart shown in FIG. 4, the output power Q from the DC power supply 1 is read (Step 220), and confirmation is made as to whether or not this output power Q has dropped below the power Q2 at which the slave unit c can also be run (Step 222), and if the output power Q has dropped below the power at which the slave unit c can be run (YES in the determination in Step 222), the remote controller 50C connected to the slave unit c is turned off (Step 224).

Upon being turned off, the remote controller 50C connected to the slave unit c turns off the magnet switch 18C to stop the slave unit c. Subsequently, the remote controller 50C connected to the slave unit c outputs to the remote controller 50A connected to the master unit the amount of output power outputted from the slave unit c.

Consequently, the remote controller 50A connected to the master unit reads the amount of output power from the slave unit c outputted from the remote controller 50C connected to the stopped slave unit c (Step 226), and the routine returns to Step 212.

In addition, if the output power Q from the DC power supply 1 drops further, and falls below the power Q1 at which the slave unit b can be run (YES in the determination in Step 216), the remote controller 50B connected to the slave unit b is also turned off (Step 228).

Upon being turned off, the remote controller 50B connected to the slave unit b turns off the magnet switch 18B to stop the slave unit b, and outputs to the remote controller 50A connected to the master unit the amount of output power from the slave unit b.

Consequently, the master unit reads the amount of output power from the slave unit b outputted from the remote controller 50B connected to the stopped slave unit b (Step 230), and continues the confirmation of the output power Q from the DC power supply 1 (Steps 204 to 208).

If the output power Q from the DC power supply 1 thus gradually drops and the DC power supply 1 stops (YES in the determination in Step 208), the magnet switch 18A is turned off to stop the master unit (Step 232). Subsequently, the amount of output power from the master unit is read from the microcomputer 22 of the master unit (Step 234), a comparison is made among the amounts of output power of the master unit and the slave units b and c (Step 236), and the order of starting of the remote controllers connected to the next master unit and the next slave units is set (Step 238).

Namely, if the amounts of output power a1, b1, and c1 of the inverters 14A, 14B, and 14C are such that b1<c1<a1, the inverter 14B whose amount of output power is the minimum is set as the next master unit, and the inverters 14A and 14C are set as the slave units. Further, since the amount of output power from the inverter 14C is smaller than that from the inverter 14A, setting is carried out such that the inverter 14C is started up earlier than the inverter 14A, and the result of this setting is outputted to the remote controller 50B connected to the inverter 14B which has been set as the next master unit.

Thus, the remote controller 50B connected to the inverter 14B which has been set as the next master unit is set in a standby state by turning on the magnet switch 18B to set the inverter 14B in the state in which the inverter 14B can be made to run.

By setting the master unit and slave units and the order of starting up the slave units in the above-described manner, the amounts of output power of the plurality of inverters 14 can be substantially equalized. In addition, by setting the master unit and slave units on the basis of the running times, the running times can be substantially equalized among the plurality of inverters 14, thereby making it possible to prolong the service life of the power supply system 12.

In particular, the service life of electronic components such as an electrolytic condenser and a cooling fan provided in the inverter 14 is greatly affected by the running time of the inverter 14. However, by substantially equalizing these running times, stable operation is made possible over an extended period of time.

It should be noted that, in the above-described structure, a plurality of relationships may be present as the relationship between the master unit and slave units of inverters, and the increase or decrease in the amount of AC output from the inverter 14 may be used in the determination of the starting or stopping of the master unit and slave units.

In addition, in the event that any inverter 14 is not effective, by excluding the remote controller 50 connected to that inverter 14 from the setting of the master unit and slave units, the inverter 14 can be cut off from the DC power supply 1 by the magnet switch 18. Consequently, system interconnection becomes possible in which the inverter 14 which is not effective is prevented from running, and the inverters 14 which are effective are used.

At this time, if the fact that the inverter 14 is not effective is displayed on the display unit 54 of the remote controller 50 connected to the inverter 14 which is not effective, it is possible to clearly determine the presence or absence of an inverter 14 which is not effective in the power supply system 12.

Meanwhile, in the power supply system 12, MPPT control is effected only by the inverter 14 which is set as the master unit, and the inverters 14 which are set as the slave units are constantly subjected to constant-level energy control.

Namely, as shown in FIG. 5A, the inverter 14B is constantly subjected to constant-level energy control in the range of the running time t2 to t5, whereas the inverter 14C is constantly subjected to constant-level energy control in the range of the running time t3 to t4, thereby respectively outputting AC power of 4 kW, i.e., the rated power.

In contrast, the inverter 14A operates in such a manner as to output the maximum power in correspondence with the increase or decrease in the output power Q constantly by MPPT control in the range of the time t1 to t6 during which the DC power is being outputted from the DC power supply 1.

As a result, as the plurality of inverters 14 effect MPPT control, an increase or decrease in the output power from one inverter 14 can be prevented from affecting the operation of the other inverters 14, and even if the plurality of inverters 14 are used, the power supply system 12 can be operated stably.

On the other hand, if the plurality of inverters 14 individually effect the protective operation, the operation becomes nonuniform among the plurality of inverters 14 due to the offset in the detection timing and the like. Hence, there are cases where the protective operation of one inverter 14 affects the protective operation of the other inverters 14, thereby rendering appropriate protection impossible.

In contrast, with the power supply system 12, independent operation as well as overvoltage, undervoltage, frequency rise, and frequency drop are monitored by the remote controller 50 connected to the inverter 14 which is set as the master unit, and the plurality of inverters 14 are collectively protected on the basis of the results of this monitoring. Consequently, protection of the plurality of inverters 14 can be effected speedily and reliably.

In addition, in a case where AC power is supplied from the inverters 14 to the commercial power supply 16, the AC power flows backward from the inverters 14 to the commercial power supply 16. This backward flow can cause a voltage rise in the commercial power supply 16. At this time, with the power supply system 12, the remote controller 50 connected to the inverter 14 which has been set as the master unit first controls the outputs of the slave inverters 14 consecutively, and lastly controls the output of the master inverter 14.

Thus, with the power supply system 12, when the plurality of inverters 14 are connected in parallel, the remote controller 50 connected to the inverter 14 which is to be the master unit is set, and the remote controller 50 connected to the master inverter 14 collectively controls the plurality of inverters 14, thereby making it possible to operate the inverters 14 without causing variations in their operations.

Furthermore, in terms of the system configuration, it goes without saying that the present invention is not limited to the above-described system in which the maximum output power of the DC power supply 1 is 12 kw, and that the present invention is applicable to systems of other outputs, such as 11 kW, 13 kW, 14 kW, and 15 kW.

As another example of control for operating the slave units, first, the DC power outputted from the DC power supply 1 is sampled at a sampling frequency of, e.g., several milliseconds to several tens of milliseconds.

Next, a first differential (first difference) of the DC power sampled for the last several minutes is determined, and from these results, a determination is made as to whether the slope of a graph, in a case in which the increases and decreases in DC power are graphed, is increasing or decreasing. Here, by using the results of the first differential, it is possible to suppress the effect of an instantaneous increase or decrease in output power accompanying an instantaneous change in the weather such as instantaneous clouding over due to a cloud or a gust of wind.

Next, if the first differential is increasing, a determination is made as to whether or not the number of inverters to be run needs to be increased. Specifically, this determination is made by estimating the DC power during the next sampling from the aforementioned first differential, and a determination is made that the number of inverters needs to be increased if this estimated value has exceeded the DC power capable of being handled by the inverter(s) which are currently running.

For example, in a case where the number of inverters which are running with the present output power of 950 W is two, if it is estimated from the aforementioned first differential that the output power during the next sampling will be 1050 W, since two 500 W-compatible inverters cannot handle such a situation, a determination is made that the number needs to be increased by one. Further, if the output power during the next sampling is estimated to be 980 W, since this situation can be handled by two inverters, a determination is made that it is not necessary to increase the number of inverters.

Next, if it is necessary to increase the number of inverters which are running, an inverter which is to be made to start running is selected by random numbers from a list of inverters currently not running.

This completes the routine, and the same routine is repeated again from the first step. It should be noted that the routine also returns to the first step in the case where there is no need to increase the number of running inverters.

Meanwhile, in a case where the first differential of the DC power for the last several minutes is not increasing, a determination is made as to whether or not the number of running inverters needs to be decreased. In this determination, in the same way as described above, the DC power during the next sampling is estimated from the aforementioned first differential, and a determination is made that the number of inverters needs to be decreased if this estimated value is such that operation is possible with a number of inverters which is less than the present number.

For example, in a case where the number of inverters being run with the present output power of 1050 W is three, if it is estimated from the aforementioned first differential that the output power during the next sampling will be 980 W, since two 500 W-compatible inverters are able to handle such a situation, a determination is made that the number needs to be decreased by one. In addition, if the output power during the next sampling is estimated to be 1020 W, since three inverters are required, a determination is made that it is unnecessary to decrease the number of inverters.

Then, if it is necessary to decrease the number of inverters which are running, an inverter to be stopped is selected by random numbers from a list of inverters which are currently running.

This completes the routine, and the same routine is repeated again from the first step. It should be noted that the routine also returns to the first step in the case where there is no need to decrease the number of running inverters.

The controlling method is not limited to the above-described method, and the number of units to be run may be controlled on the basis of the value of the increase or decrease in the DC power, or by using fuzzy inference based on the value of the increase or decrease in the DC power. Alternatively, the number of units to be run may be controlled by simply comparing the value of the DC power with a set value.

Further, the present invention is applicable to not only single-phase DC/AC converters and three-phase DC/AC converters, but also to DC/AC converters of any form.

It should be noted that the present embodiment is illustrative only, and does not limit the structure of the present invention. The present invention is applicable to parallel-connected systems of various configurations in which a plurality of inverters are connected in parallel.

What is claimed is:

1. A method of operation for a power supply system having a plurality of inverters connected in parallel with a DC power supply whose generated electric energy increases or decreases, in which said inverters convert an electric output from said DC power supply to frequency- and voltage-controlled AC power and output the AC power to a system, the method comprising:

(a) setting any one of the inverters to serve as a master unit and the other inverters to serve as slave units, wherein the master unit controls the slave units;

(b) allowing said master unit to control said slave units on the basis of at least one of an increase or decrease in the electric energy from the DC power supply and an increase or decrease in the AC power outputted from said inverters; and (c) controlling operation of said inverters on the basis of DC power available, the controlling causing more inverters to run if sufficient DC power is available and fewer inverters to run if there is insufficient DC power, wherein said controlling operates any one of said inverters such that the amount of AC power outputted from said any one of said inverters increases or decreases in correspondence with an increase or decrease in the amount of electric power outputted from the DC power supply, and said controlling operates remaining ones of said invertes at a predetermined standard value.

2. The method of claim 1, wherein, in the first step, when running is suspended, said master unit sets, as a master unit to be used at a start of the next running, an inverter having the lowest amount of output AC power or shortest running time from among all of the inverters, and sets the remaining inverters as slave units.

3. The method of claim 1, wherein, in the first step, when running is suspended, said master unit orders the slave units in an ascending order starting from the slave unit having the lowest amount of output AC power or the shortest running time.

4. The method of claim 3, wherein, in the first step, the ordering of the slave units is randomly set by using random numbers.

5. The method of claim 1, further comprising the steps of connecting each inverter to a remote controller for remotely controlling the inverter and connecting the remote controllers to one another so that the remote controllers can transmit and receive signals to and from one another, and wherein the operating of said inverters is effected through said remote controllers in the second step.

6. The method of claim 1, wherein, in the second step, the master unit operates the slave units in accordance with an amount of electric power output from said DC power supply.

7. The method of claim 1, wherein, in the second step, a number of slave units which are to run is determined on the basis of whether the DC power is increasing or decreasing, which is estimated by a first differential of the electric power output from said DC power supply.

8. The method of claim 1, wherein, in at least one of the first and second steps, an inverter which is ineffective is excluded from being an object of running.

9. A system for converting DC power to AC power, comprising:

(a) a plurality of inverters, each inverter being adapted to receive DC power and convert the DC power to AC power; and (b) a controller connected to the inverters and controlling operation of said inverters on the basis of DC power available, the controller causing more inverters to run if sufficient DC power is available and fewer inverters to run if there is insufficient DC power, wherein said controller operates any one of said inverters such that the amount of AC power outputted from said any one of said inverters increases or decreases in correspondence with an increase or decrease in the amount of electric power outputted from the DC power supply, and said controller operates remaining ones of said inverters at a predetermined standard value.

10. The system of claim 9, wherein said controller is inside of each of said inverters.

11. The system of claim 9, wherein said controller is outside of each of said inverters.

12. The system of claim 9, wherein said any one of said inverters effects maximum power point tracking control by following the increase or decrease in DC power inputted to said any one of said inverters, and said remaining ones of said inverters are subjected to constant-level energy control for constantly obtaining maximum outputs.

13. A system for converting generated electric power to AC power, wherein a plurality of inverters provided respectively with a protector for effecting system interconnection protection for a commercial power supply are connected in parallel, and electric power generated by a generator is converted to electric power corresponding to a commercial power supply and is outputted from a number of inverters which number is determined on the basis of the amount of generated electric power, comprising:

a controller for effecting protected operation of said plurality of inverters by a protector provided in at least one of said inverters when at least two of said inverters are running.

14. The system of claim 13, wherein said controller sets one master unit, and the system interconnection protection of said plurality of inverters is effected by said protector of said master unit.

15. The system of claim 9, wherein said controller includes remote controllers which are respectively connected to said plurality of inverters and communication means for connecting said remote controllers with one another.

16. The system of claim 13, wherein said controller includes remote controllers which are respectively connected to said plurality of inverters and communication means for connecting said remote controllers with one another.

17. A system of claim 9, wherein, when running of said generator is suspended, said master unit sets a master unit to be used during the start of the next running of said generator.

18. A system of claim 13, wherein, when running of said generator is suspended, said master unit sets a master unit to be used during the start of the next running of said generator.

19. The system of claim 9, wherein, when running of said generator is suspended, said master unit sets as a master unit to be used during the start of the next running of said generator an inverter having the lowest amount of output power or shortest running time from among said inverters including said master inverter.

20. The system of claim 13, wherein, when running of said generator is suspended, said master unit sets as a master unit to be used during the start of the next running of said generator an inverter having the lowest amount of output power or shortest running time from among said inverters including said master inverter.

* * * * *